United States Patent
Draper et al.

(10) Patent No.: US 11,472,242 B1
(45) Date of Patent: Oct. 18, 2022

(54) BRACKET ASSEMBLY FOR A WEIGHT DISTRIBUTION SYSTEM

(71) Applicant: HORIZON GLOBAL AMERICAS INC., Plymouth, MI (US)

(72) Inventors: Owen Draper, Plymouth, MI (US); Brad Larsh, Plymouth, MI (US); Henry J. Guthard, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 17/197,202

(22) Filed: Mar. 10, 2021

Related U.S. Application Data (60) Provisional application No. 62/987,391, filed on Mar. 10, 2020.

(51) Int. Cl.
  *B60D 1/24* (2006.01)
  *B60D 1/34* (2006.01)
  *B60D 1/06* (2006.01)

(52) U.S. Cl.
  CPC ............... *B60D 1/247* (2013.01); *B60D 1/06* (2013.01); *B60D 1/345* (2013.01)

(58) Field of Classification Search
  CPC .................................................... B60D 1/247
  See application file for complete search history.

(56) References Cited

U.S. PATENT DOCUMENTS

| | | | | |
|---|---|---|---|---|
| 5,890,726 A * | 4/1999 | McCoy | ............... | B60D 1/50 280/406.1 |
| 6,419,257 B1 * | 7/2002 | McCoy | ............... | B60D 1/167 280/406.2 |
| 8,186,702 B2 * | 5/2012 | McCoy | ............... | B60D 1/58 280/406.1 |
| 8,628,107 B2 * | 1/2014 | Harper | ............... | B60D 1/247 280/515 |
| 10,035,391 B2 * | 7/2018 | Mauerman | ............... | B60D 1/247 |
| 10,875,368 B1 * | 12/2020 | Angel | ............... | B60D 1/325 |
| 2014/0265240 A1 * | 9/2014 | McCoy | ............... | B60D 1/247 280/405.1 |
| 2020/0324591 A1 * | 10/2020 | McCall | ............... | B60D 1/58 |
| 2021/0094370 A1 * | 4/2021 | McAllister | ............... | B60D 1/247 |

* cited by examiner

*Primary Examiner* — Kevin Hurley
(74) *Attorney, Agent, or Firm* — McDonald Hopkins LLC (57) ABSTRACT

An adjustable bracket assembly for a weight distribution system is shown and described herein. The adjustable bracket assembly may include a plurality of bracket members including at least a first bracket member, a second bracket member, a third bracket member, and a fourth bracket member arranged to be adjustable relative to one another and be selectively attached to a frame of a towed vehicle. The plurality of bracket members may be coupled to a plurality of fasteners to allow the plurality of bracket members to be adjusted relative to one another and to provide clamp forces relative to the frame of the towed vehicle. An attachment assembly may be coupled to the first bracket member and be configured to be attached to a spring arm of a weight distributing system that may be coupled to a towing vehicle.

16 Claims, 9 Drawing Sheets

BRACKET ASSEMBLY FOR A WEIGHT DISTRIBUTION SYSTEM

RELATED APPLICATION

This application claims the benefit of U.S. Provisional Application No. 62/987,319, filed Mar. 10, 2020, which is incorporated by reference in its entirety.

TECHNICAL FIELD

The present disclosure generally relates to an adjustable bracket for connecting a weight distributing system to a towed vehicle. More particularly, the present disclosure relates to an adjustable bracket assembly configured for improving stability between at least one spring bar and related attachment members for a weight distributing system that may be used for towing a vehicle.

BACKGROUND

Many vehicles are designed to transport freight, goods, merchandise, personal property, and other such cargo. Often, such vehicles are arranged to tow a towed vehicle, such as a trailer by attaching the towed vehicle to the towing vehicle though the use of a hitch assembly. For example, a hitch assembly may attach a trailer to a towing vehicle through a hitch ball and coupler arrangement that allows relative movement between the towing vehicle and the trailer as the towing vehicle makes turns, traverses uneven or rough terrain, and passes along inclining and declining roadways.

Even distribution of the weight of a towed vehicle among the axles of the towing vehicle is important to the effective operation of a towing vehicle that is towing the towed vehicle. Towed vehicles are often loaded with heavy cargo and may substantially outweigh the towing vehicle. When such a towed vehicle is coupled or secured to the rear of a towing vehicle, the majority of the weight of the towed vehicle may be borne by the rear axle of a towing vehicle. Such uneven weight distribution may lower the rear of the towing vehicle and raise the front of the towing vehicle. Under such conditions, the tires of the rear axle may bear substantially more weight than the tires of the front axle of the towing vehicle.

Therefore, there is a need for an improved weight distribution system that overcomes the deficiencies noted above.

SUMMARY

Disclosed is an adjustable bracket assembly for a weight distribution system as is shown and described herein. An example weight distribution system includes a hitch assembly, an adjustable bracket, and a spring arm. The hitch assembly includes a ball mount configured to be mounted to a hitch of a towing vehicle. The adjustable bracket is configured to be mounted to a frame member of a towed vehicle. The adjustable bracket includes a first bracket member, and an attachment member configured to slidably mount to first bracket member. The first bracket member defines a first plurality of mounting holes and the attachment member defines a second plurality of mounting holes to adjust the height of the attachment member relative to the frame member. The spring arm operatively engages between the hitch assembly and the attachment member.

An example adjustable bracket to mount to a frame member of a towed vehicle includes a first bracket member and an attachment member. The first bracket member is configured to abut an outer side of the frame member. The attachment member defines a slide channel in which the first bracket member slidably engages. The attachment member is configured to operatively engage with a spring arm between the adjustable bracket and a hitch assembly mounted to a towing vehicle. The first bracket member defines a first plurality of mounting holes and the attachment member defines a second plurality of mounting holes to adjust the height of the attachment member relative to the frame member.

An example adjustable bracket assembly for a weight distribution system includes a plurality of bracket members including at least a first bracket member, a second bracket member, a third bracket member, and a fourth bracket member arranged to be adjustable relative to one another and be selectively attached to a frame of a towed vehicle. The adjustable bracket assembly also includes a plurality of fasteners to allow the plurality of bracket members to be adjusted relative to one another and to provide two clamp forces relative to the frame of the towed vehicle. Additionally, the adjustable bracket assembly includes an attachment assembly slidably coupled to the first bracket member and configured to be (i) vertically adjustable relative the frame, and (ii) attached to a spring arm of a weight distributing system coupled to a towing vehicle.

BRIEF DESCRIPTION

Operation of the disclosure may be better understood by reference to the following detailed description taken in connection with the following illustrations, wherein.

DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
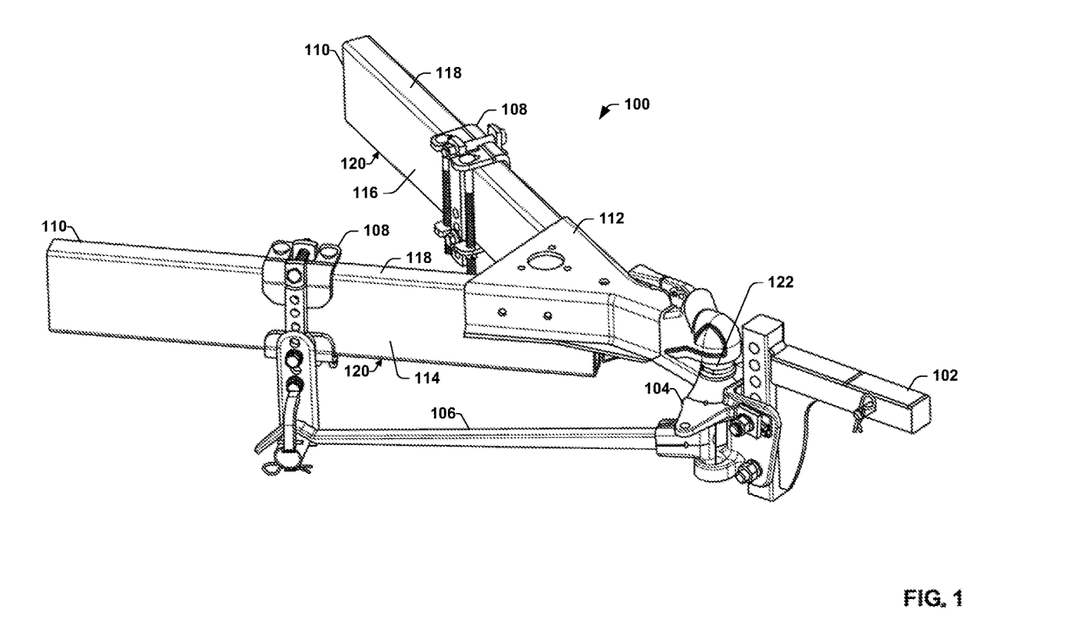
FIG. 1 is a perspective view of an adjustable bracket assembly for a weight distribution system, in accordance with the teachings of this disclosure.

FIG. 1 illustrates an example weight distribution system 100 for a hitch assembly 102 that is configured to distribute weight and control sway of a towed vehicle (not shown) attached to a towing vehicle (not shown) within a vehicle towing system. The towed vehicle may be coupled, attached, or otherwise secured to the towing vehicle through any appropriate manner. In the illustrated example, the weight distribution system 100 includes a hitch ball mount head 104.

The example weight distribution system 100 includes a pair of spring arms 106 mounted to and extending from the hitch ball mount head 104 affixed to the hitch assembly 102. Alternatively, in some examples, the spring arms 106 may be operatively coupled directly to the hitch assembly 102 via any suitable fastening means. In an example, the weight distribution system as described in U.S. Pat. No. 10,183,536 may be used with adjustable bracket assemblies 108 as described below and is incorporated herein in its entirety. In the illustrated example, the pair of spring arms 106 are substantially identical to one another. However, each of the pair of spring arms 106 may have variations from the other due to, for example, different configurations of towed and/or towing vehicles.

In the illustrated example, the towed vehicle includes a pair of frame members 110 that are configured to be attached to a hitch assembly 102 of a towing vehicle. In the example illustrated in FIG. 1, a coupler 112 is attached to a front end of the frame members 110 such as being welded, bolted or otherwise attached thereto. The towed vehicle may include an A-frame having a pair of the frame members 110 formed in an angled orientation. The frame members 110 each include an outer side 114, inner side 116, top side 118, and bottom side 120. The hitch assembly 102 may be selectively attached or coupled to the coupler 106 via any appropriate manner. As such, the coupler 112 may be positioned over the hitch ball 122 and secured therein to secure a towed vehicle to a towing vehicle. Additional, linkages between the frame member 110 of the towed vehicle and the hitch assembly 102 may also be provided. Any appropriate manner may be utilized to secure two vehicles. This may, for example, control or influence the distribution of weight of the towed vehicle and control or influence the sway of the towed vehicle.

Figure 2:
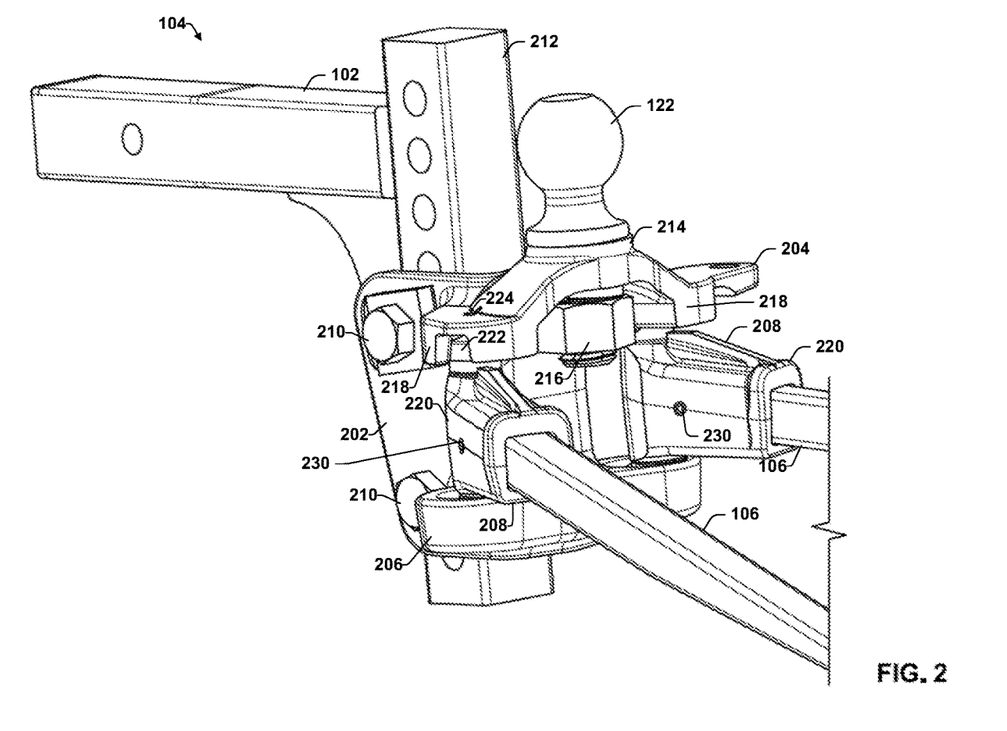
FIG. 2 is a perspective view of a hitch ball mount head of the adjustable bracket assembly of FIG. 1, in accordance with the teachings of this disclosure.
Figure 3:
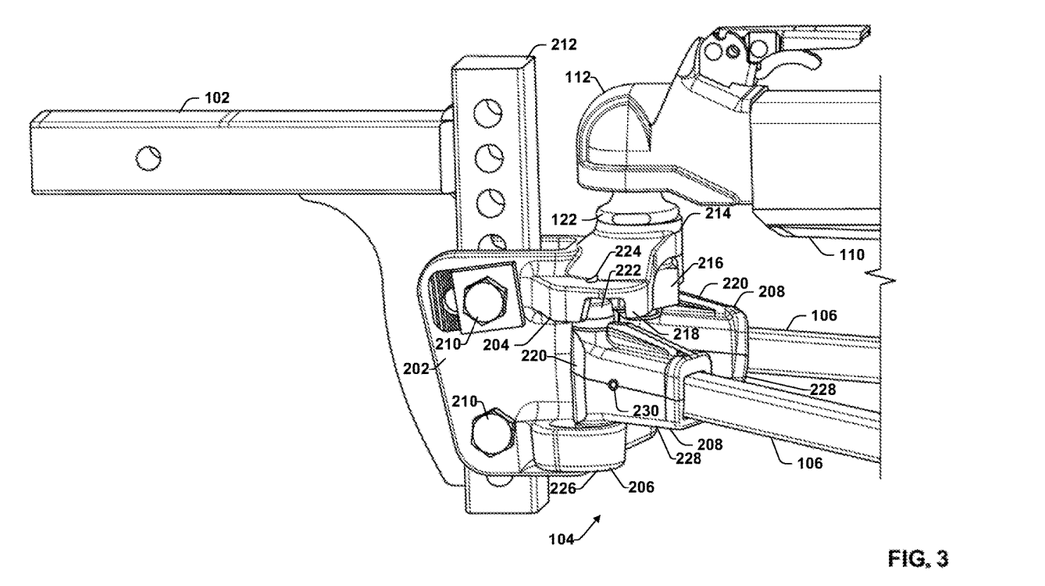
FIG. 3 is a side view of the hitch ball mount head of the adjustable bracket assembly of FIG. 1, in accordance with the teachings of this disclosure.
Figure 4:
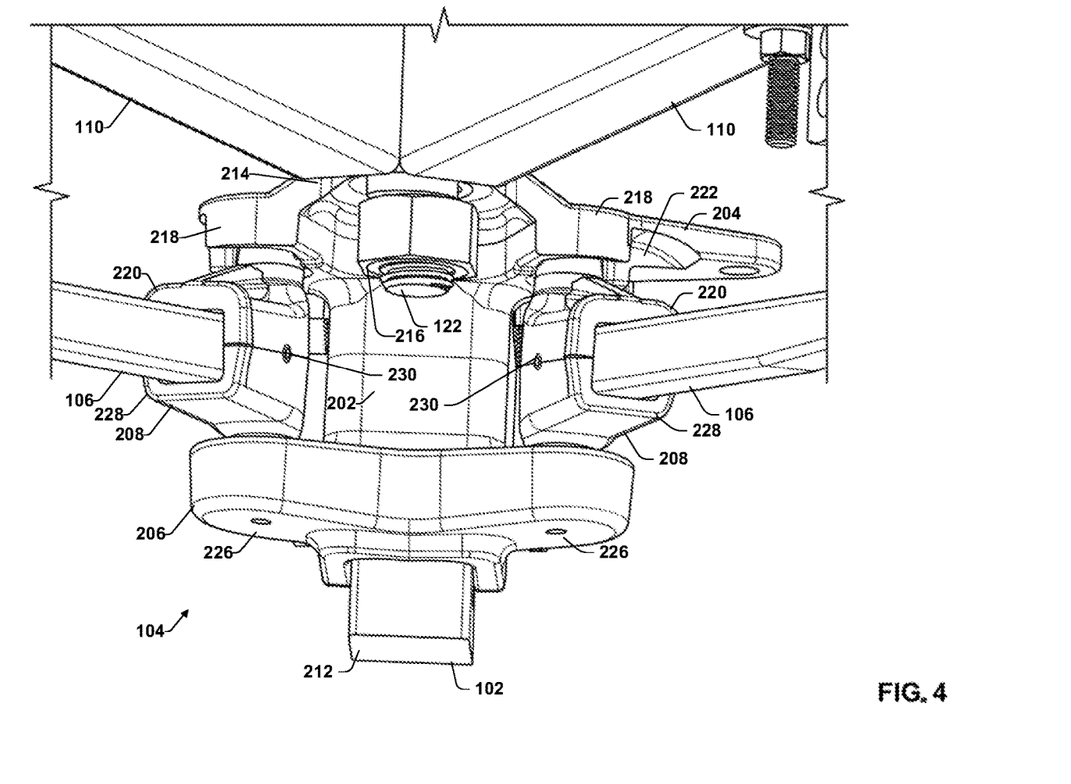
FIG. 4 is a front view of the hitch ball mount head of the adjustable bracket assembly of FIG. 1, in accordance with the teachings of this disclosure.
Figure 5:
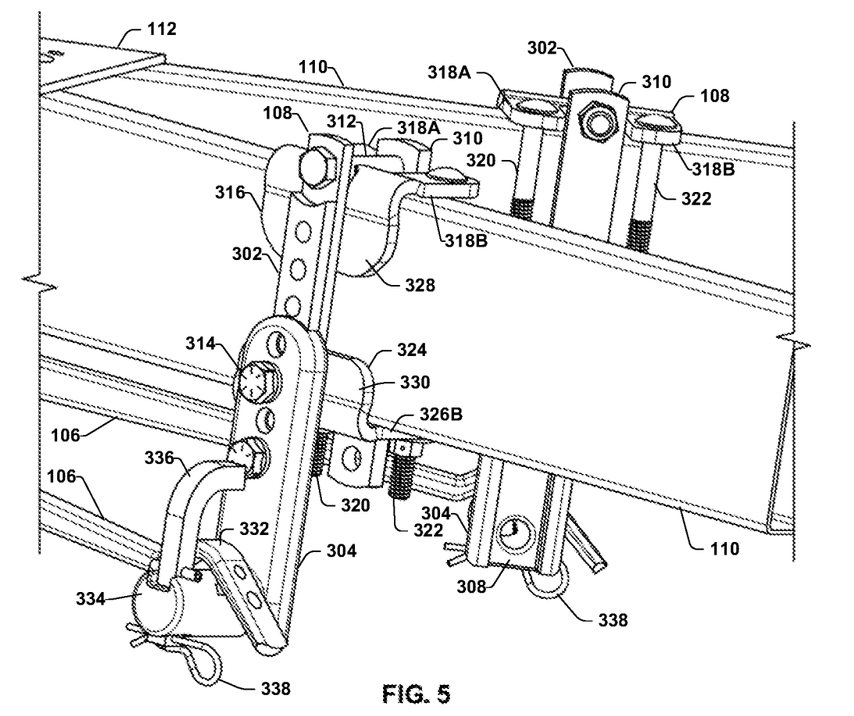
FIGS. 5, 6, and 7 are outer perspective views of an outer frame bracket of the adjustable bracket assembly of FIG. 1, in accordance with the teachings of this disclosure.
Figure 6:
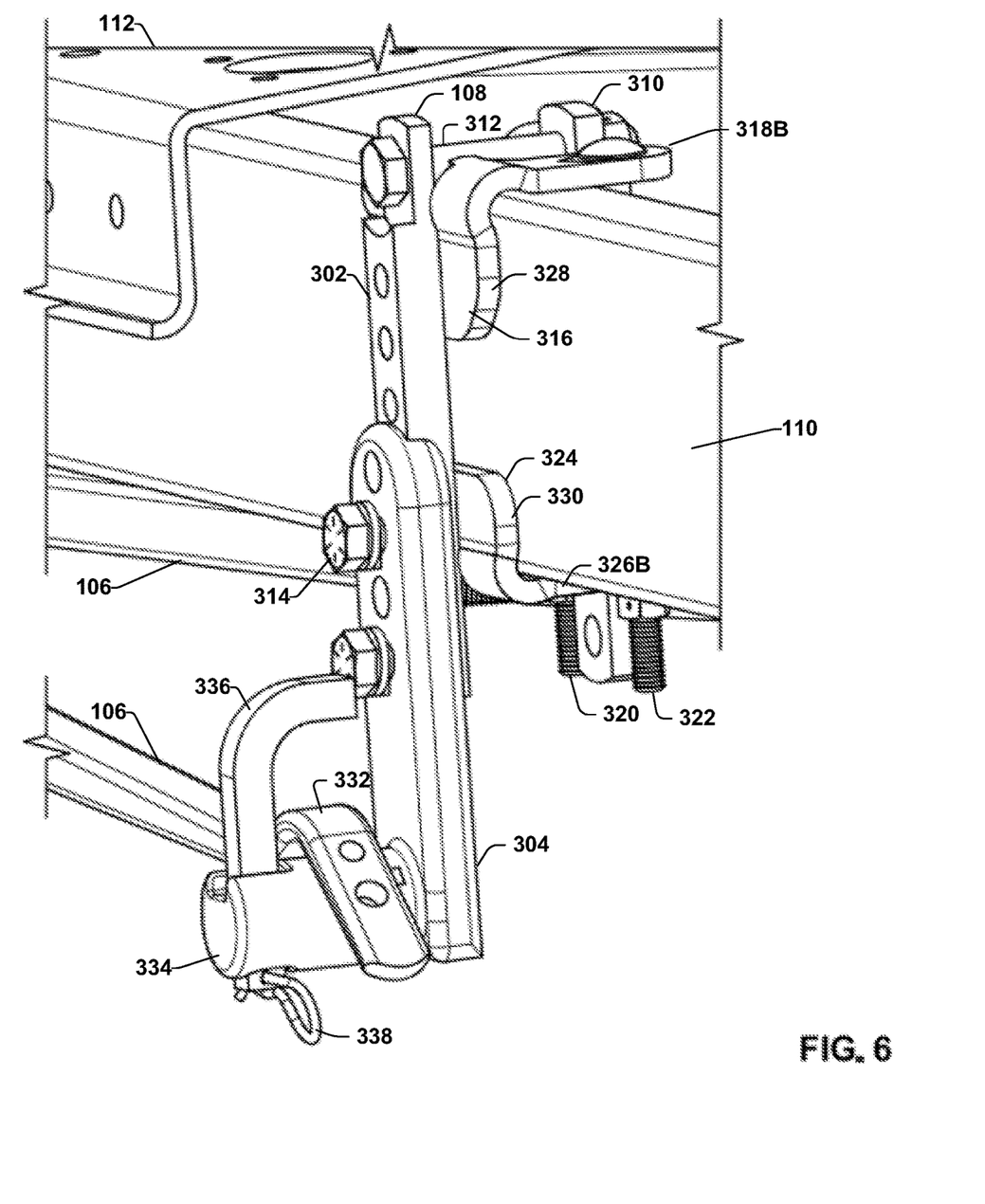
Figure 7:
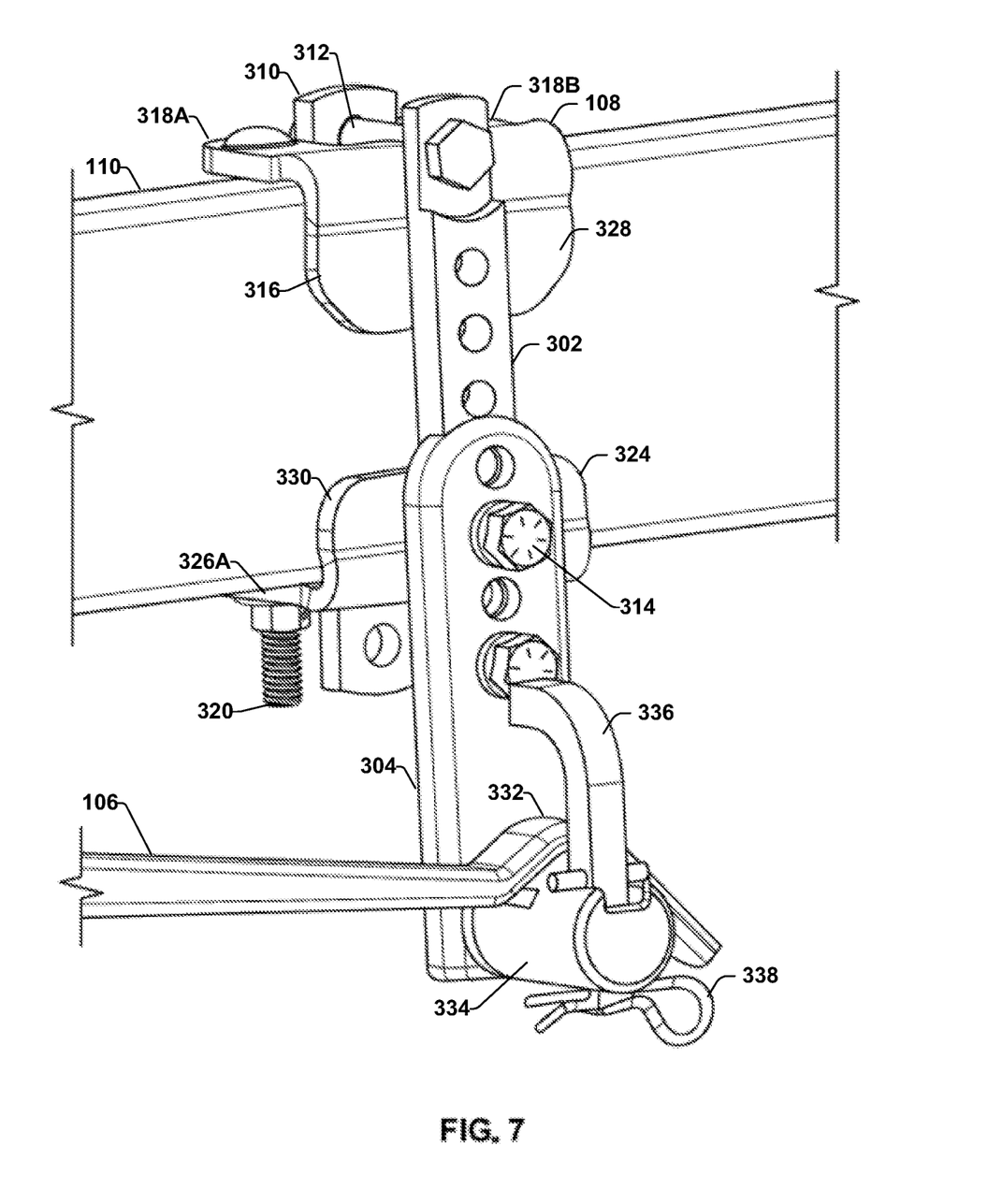
Figure 8:
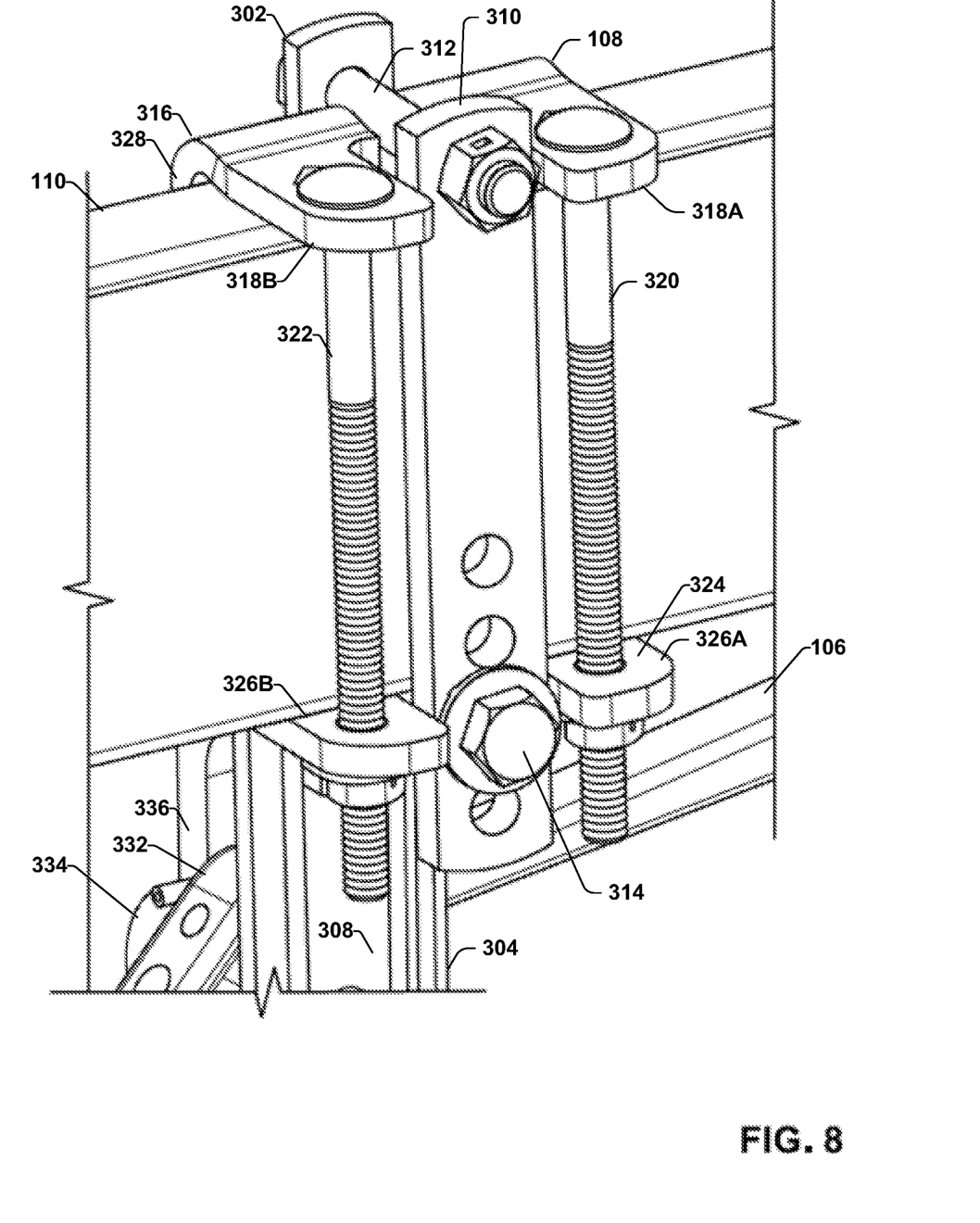
FIGS. 8 and 9 are inner perspective views of an outer frame bracket of the adjustable bracket assembly of FIG. 1, in accordance with the teachings of this disclosure.
Figure 9:
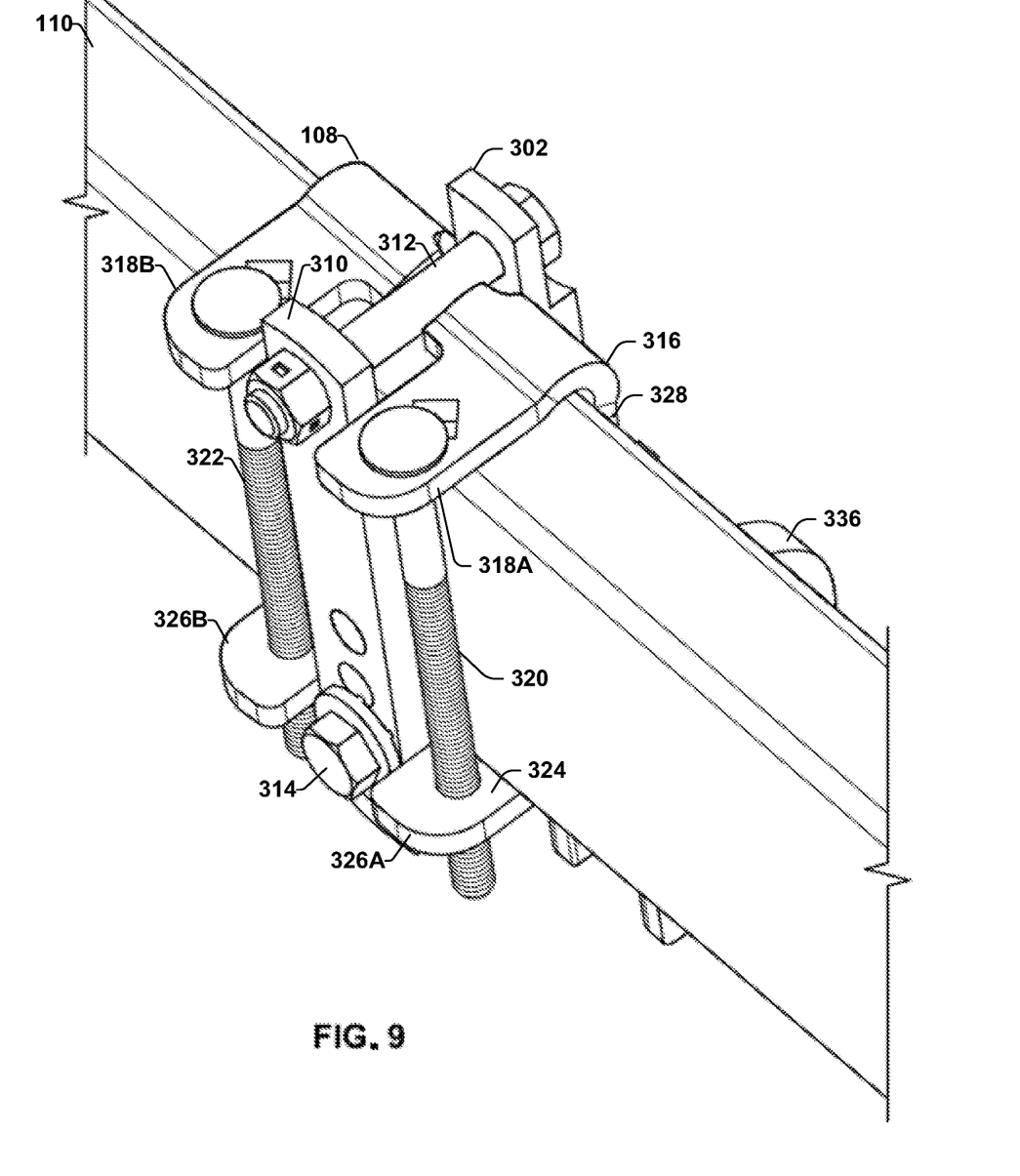

FIGS. 2, 3, and 4 illustrate an example of the hitch ball mount head 104 of FIG. 1. In the illustrated example, the hitch ball mount head 104 includes the hitch ball 122 secured thereto such that the coupler 112 may be positioned over the hitch ball 122 and secured to the hitch ball 122, thus securing the towed vehicle to the towing vehicle. The example hitch assembly 102 may provide additional linkages between the frame members 110 of the towed vehicle and the ball hitch assembly 102. As described herein, the hitch ball mount head 104 promotes the distribution of weight of the towed vehicle and may control or influence the sway of the towed vehicle. In the illustrated examples, the hitch ball mount head 104 includes the hitch ball 122, a body 202, an upper wing plate 204, a lower plate 206, and swing mounts 208.

The body 202 is configured to be mounted onto the hitch assembly 102. In the illustrated example, the body 202 comprises holes through which fasteners 210 pass. The fasteners 210 pass though one hole of the body 202, pass through holes defined on a square mounting tube 212, and pass through the corresponding hole on the other side of the body 202. The fasteners 210 are then secured (e.g., via a washer and a nut, etc.).

The upper wing plate 204 provides a mount 214 for the hitch ball 122, which may be secured to the upper wing plate 204 via a hitch ball nut 216. The upper wing plate 204 includes upper swivel mounts 218 for the swing mounts 208 that are configured to removably engage with an upper portion 220 of the swing mounts 208. For example, the upper wing plate 204 may define apertures 222 through which the swing mounts 208 may pivot in order to install and remove the swing mounts 208. The upper wing plate 204 may define mounting holes 224 through which fasteners may pass to rotatably secure the swing mounts 208. In some examples, the upper wing plate 204 is integrated into the body 202. Alternatively, in some examples, the upper wing plate 204 is a separate piece that is configured to attach to the body 202.

The lower plate 206 includes lower swivel mounts 226 that are configured to removably engage with a lower portion 228 of the swing mounts 208. Together, upper swivel mounts 218 of the upper wing plate 204 and the lower swivel mounts 226 of the lower plate 206 form a mount in which the swing mounts 208 may be rotatably mounted. In some examples, the lower plate 206 is integrated into the body 202. Alternatively, in some examples, the lower plate 206 is a separate piece that is configured to attach to the body 202.

In the illustrated examples, the swing mounts 208 include the upper portion 220 and the lower portion 228. Together, the upper portion 220 and the lower portion 228 form a shell around one end of one of the spring arms 106. A pin or fastener may secure the frame members 110 through overlapping mounting holes 230 defined in the upper portion 220 and the lower portion 228. In such a manner, the spring arms 106 are rotatably coupled to the hitch ball mount head 104. In other embodiments, the spring arms 106 may be attached to the hitch ball mount head 104 through a trunnion that doesn't need a separate pin or fastener.

FIGS. 5, 6, 7, 8, and 9 illustrate an example adjustable bracket assembly 108 configured for improving stability of a weight distribution system. The adjustable bracket assembly 108 may include a pair of assemblies that may be substantially similar; however, the present teachings are not limited to such. In some embodiments, the pair of adjustable bracket assemblies 108 may be of different configurations. For purposes of this disclosure, only one reference number will be used for the pair of adjustable bracket assemblies 108, and any illustration or description of an adjustable bracket assembly 108 will apply to either adjustable bracket assembly 108. Although an example is illustrated and described herein as having a pair of spring arms 106 and a pair of adjustable bracket assemblies 108, it is contemplated that such an assembly may include greater or fewer than two spring arms 106 and greater than or fewer than two adjustable bracket assemblies 108 to attach those spring arms 106 to frame members 110 of a towed vehicle.

In the illustrated example, the adjustable bracket assembly 108 includes a first bracket member 302 that is configured to be selectively attached to an attachment member 304. The first bracket member 302 may include a generally elongated plate body having a plurality of apertures along its length and include a cross sectional profile shape configured to slidingly fit within a channel body 308 of the attachment member 304. However, the first bracket member 302 may be attached to the attachment member 304 in various ways as will be discussed more fully below. The first bracket member 302 may be configured to be positioned along the outer surface 114 of the frame member 110.

A second bracket member 310 may be selectively and adjustably attached to the first bracket member 302 by at least one fastener and may be configured to be positioned along an inner surface 116 of the frame member 110. The second bracket member 310 may be a generally elongated plate having a plurality of apertures along its length and may be positioned adjacent to and abut against the inner surface 116 of the frame member 110 opposite from the outer surface 114 of the frame member 110. In an embodiment, the second bracket member 310 may include a length that is generally comparable to the length of the first bracket member 302. However, the first and second bracket members 302 and 310 may also have different lengths and different cross sectional profiles. The plurality of apertures along the first and second bracket members 302 and 310 may be configured to receive fastener members therein to support and attach the bracket members 302 and 310 to one another and to be clampingly arranged and adjusted as needed relative to the frame member 110.

The first bracket member 302 includes at least one aperture configured to be located above the upper surface 118 of frame member 110 that is configured to receive an upper fastener 312. The upper fastener 312 may abut and/or may extend across the upper surface 118 of the frame member 110. The upper fastener 312 may be a cylindrical member such as a bolt that may include a washers (not shown) and a nut along with threaded portions thereon. The first bracket member 302 may further include at least one aperture located below the bottom surface 120 of the frame member 110 that is configured to receive a lower fastener 314. The lower fastener 314 may abut and/or may extend across the bottom surface 120 of the frame member 110. The upper fastener 312 and lower fastener 314 may attached the first bracket member 302 to the second bracket member 310 along opposing sides of the frame member 110.

In the illustrated examples, a third bracket member 316, when installed, abuts against the upper surface 120 of frame member 110. The third bracket member 316 may include a plate body that defines pair of upper spaced protrusions 318A and 318B (collectively "upper spaced protrusions 318") configured to extend beyond the upper surface 118, each having at least one aperture configured to receive an elongated fasteners 320 and 322 respectively.

A fourth bracket member 324, when installed, abuts against the lower surface 120 of frame member 110. The fourth bracket member 324 may be a plate body that includes a pair of lower spaced protrusions 326A and 326B (collectively "lower paced protrusions 326") configured to extend beyond the lower surface 120, each having at least one aperture configured to receive the elongated fasteners 320 and 322 respectively. Each elongated fastener 320 and 322 may extend between the third and fourth bracket members 316 and 324 along the inner surface 116 of frame member 110 to selectively and adjustably attach the third bracket member 316 to the fourth bracket member 324. When each elongated fastener 320 and 322 is fastened, a clamp load may be applied to upper surface 118 and lower surface 120 of frame member 110.

In the illustrated example, the second bracket member 310 is located between and extend transversely relative to the upper spaced protrusions 318 of the third bracket member 316. Additionally, the second bracket member 310 may be located between and extend transversely relative to the lower spaced protrusions 326 of the fourth bracket member 324. This configuration facilitates the second bracket member 310 to be aligned with the third and fourth bracket members 316 and 324.

The upper fastener 312 may be positioned between the upper spaced protrusions 318 of the third bracket member 316. The lower fastener 314 may be positioned between the lower spaced protrusions 326 of the fourth bracket member 324. As the upper fastener 312 and lower fastener 314 are tightened, the second bracket member 310 may apply a clamp load against the inner surface 116 of the frame member 110 and the first bracket member 302 may apply a clamp force against a transverse portion 328 of the third bracket member 316 and a transverse portion 330 of the fourth bracket member 324 which in turn apply clamp forces to the outer surface 114 of the frame member 110. The applied clamp loads yield a reduction in movement between the components and thus add to the stability of the adjustable bracket assembly 108.

The first bracket member 302 may be selectively coupled and selectively attached to the attachment assembly 304. The attachment assembly 304 may be attached to the spring arm 106 of the weight distribution system 100. The attachment assembly 304 may be selectively attached to the first bracket member 302 via a fastener or any other suitable means of attachment. Further, the attachment assembly 304 may include a channel body 308 that defines a cavity configured to slidingly receive the elongated configuration of the first bracket member 302. The attachment assembly 304 may include a plurality of apertures configured to be aligned with a plurality of apertures along the length of the first bracket member 302 to allow for lengthwise adjustment of the attachment assembly 304 relative to the first bracket member 302. In some examples, the transverse portion 330 of the third bracket member 316 is sandwiched between the first bracket member 302 and the outer surface 114 of frame member 110. In some examples, the transverse portion 330 is integrated or directly attached to the first bracket member 302. Further, in some examples, the transverse portion 330 of the fourth bracket member 324 is sandwiched between the first bracket member 302 and the outer surface 114 of frame member 110. In some examples, the transverse portion 330 is integrated or directly attached to the first bracket member 302. The plurality of apertures of the first, second, third, and fourth bracket members 302, 310, 316, and 324 may be configured to receive fasteners or bolts to accommodate frame members 110 of various sizes and configurations. Further, the plurality of apertures may have varying sizes to accommodate fasteners of various sizes and configurations.

In the illustrated examples, a second end of the spring arm 106 includes a hooked portion 332 to engage with a shoe bracket 334. The shoe bracket 334 is attached to the attachment assembly 304. The attachment assembly 304 may, for example, be monolithically formed with the shoe bracket 112, or the shoe bracket 112 may, for example be attached to the attachment assembly 304 through welding, fastening or other forms of adhering. The side bracket 108 may be positioned relative to the coupler 112 such that the shoe bracket 334 is appropriately positioned relative to the spring arm 106.

An L-shaped member 336 of the shoe bracket 334 generally forms a cavity into which or through which the spring arm 106 engages such that a base 336 of the shoe bracket 334 engages the hooked portion 332 of the spring arm 106. In some examples, the L-shaped member 336 is selectively attached with the shoe bracket 334. This may, for example, simplify the engagement of the spring arm 106 with the shoe bracket 334. In some example, clip 338 may be removed to remove the L-shaped member 336 from the shoe bracket 334. This may, for example, provide easy access for the second end of the spring arm 106 to be engaged with the shoe bracket 334. The interaction between the second end of the spring arm 106 and the shoe bracket 334 may for example, affect (e.g., increase, etc.) sway control and/or affect (e.g., increase, etc.) the distribution of the weight from a towed vehicle to the towing vehicle.

To minimize swaying of a towed vehicle, a weight distributing system may be coupled to the towing system. Attaching such weight distributing systems may lead to slip between the coupled systems that results in instability. As described above, the weight distributing system 100 according to this disclosure may overcome this instability to minimize slip and improve stability between a towing system and the weight distributing system 100.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof

The invention claimed is:

1. A weight distribution system comprising:
    a hitch assembly including a ball mount configured to be mounted to a hitch of a towing vehicle;
    an adjustable bracket configured to be mounted to a frame member of a towed vehicle, the adjustable bracket including:
        a first bracket member, and
        an attachment member configured to slidably mount to first bracket member, the first bracket member defining a first plurality of mounting holes and the attachment member defining a second plurality of mounting holes to adjust the height of the attachment member relative to the frame member;
    a second bracket member, and wherein when installed, the first and second bracket members provide a clamping force between an inner surface and an outer surface of the frame member;
    a third bracket member configured to attach to the first bracket member; and
    a fourth bracket member configured to attach to the first bracket member, wherein, when installed, the third and fourth bracket members provide a clamping force between an upper surface and a lower surface of the frame member; and
    a spring arm configured to operatively engage between the hitch assembly and the attachment member.

2. The weight distribution system of claim 1, wherein the third bracket member further comprises:
    a transverse portion configured to abut an outer side of the frame member; and
    two spaced protrusions configured to abut the upper side of the frame member.

3. The weight distribution system of claim 2, wherein the two spaced protrusions are configured such that a fastener fastening the first bracket member to a second bracket member is positioned between the two spaced protrusions.

4. The weight distribution system of claim 1, wherein the fourth bracket member further comprises:
    a transverse portion configured to abut an outer side of the frame member; and
    two spaced protrusions configured to abut the lower side of the frame member.

5. The weight distribution system of claim 4, wherein the two spaced protrusions are configured such that a fastener fastening the first bracket member to a second bracket member is positioned between the two spaced protrusions.

6. The weight distribution system of claim 1, wherein the attachment member defines a slide channel in which the first bracket member slidably engages with the attachment member.

7. The weight distribution system of claim 1, wherein the hitch assembly comprises a swing mount configured to mount to a first end of the spring arm to provide a rotating connection between the hitch assembly and the spring arm.

8. The weight distribution system of claim 7, wherein the hitch assembly further comprises:
    an upper plate to which the ball mount is configured to be removably mounted; and
    a lower plate configured to, in combination with the upper plate, provide the rotating connection for the swing mount.

9. The weight distribution system of claim 1, wherein an end of the spring arm includes a hook portion to engage with the attachment member.

10. An adjustable bracket to mount to a frame member of a towed vehicle, the adjustable bracket comprising:
    a first bracket member configured to abut an outer surface of the frame member,
    an attachment member defining a slide channel in which the first bracket member slidably engages, the attachment member configured to operatively engage with a spring arm between the adjustable bracket and a hitch assembly mounted to a towing vehicle,
    wherein the first bracket member defines a first plurality of mounting holes and the attachment member defines a second plurality of mounting holes to adjust the height of the attachment member relative to the frame member;
    a second bracket member configured to abut an inner side of the frame member, and wherein when installed, the first and second bracket members provide a clamping force between the inner surface and the outer surface of the frame member;
    a third bracket member configured to attach to the first bracket member; and
    a fourth bracket member configured to attach to the first bracket member, wherein, when installed, the third and fourth bracket members provide a clamping force between an upper surface and a lower surface of the frame member.

11. The adjustable bracket of claim 10, wherein the third bracket member further comprises:
    a transverse portion configured to abut an outer side of the frame member; and
    two spaced protrusions configured to abut the upper side of the frame member.

12. The adjustable bracket of claim 11, wherein the two spaced protrusions are configured such that a fastener fastening the first bracket member to a second bracket member is positioned between the two spaced protrusions.

13. The adjustable bracket of claim 11, wherein the two spaced protrusions are configured to extend beyond the frame member, and wherein define each spaced protrusion defined a fastener hole in a portion that extends beyond the frame member.

14. The adjustable bracket of claim 10, wherein the fourth bracket member further comprises:
    a transverse portion configured to abut an outer side of the frame member; and
    two spaced protrusions configured to abut the lower side of the frame member.

15. The adjustable bracket of claim 10, wherein at least one of the third bracket or the fourth bracket are integrally formed with the first bracket.

16. An adjustable bracket assembly for a weight distribution system comprising:
- a pair of brackets attachable to a frame of a towed vehicle, wherein each of the pair of brackets comprises a first bracket member, a second bracket member, a third bracket member, and a fourth bracket member arranged to be adjustable relative to one another and be selectively attached to the frame of the towed vehicle;
- a plurality of fasteners to allow the first, second, third and fourth bracket members to be adjusted relative to one another and to provide two clamp forces relative to the frame of the towed vehicle; and
- an attachment assembly slidably coupled to the first bracket member and configured to be (i) vertically adjustable relative the frame, and (ii) attached to a spring arm of a weight distributing system coupled to a towing vehicle.

* * * * *